(12) United States Patent
Wang

(10) Patent No.: US 11,104,399 B2
(45) Date of Patent: Aug. 31, 2021

(54) BICYCLE WITH COLLAPSIBLE HANDLE BARS

(71) Applicant: Tai-Chih Wang, Taichung (TW)

(72) Inventor: Tai-Chih Wang, Taichung (TW)

( * ) Notice: Subject to any disclaimer, the term of this patent is extended or adjusted under 35 U.S.C. 154(b) by 221 days.

(21) Appl. No.: 16/577,750

(22) Filed: Sep. 20, 2019

(65) Prior Publication Data
US 2021/0086863 A1    Mar. 25, 2021

(51) Int. Cl.
*B62K 21/16* (2006.01)
*B62K 21/18* (2006.01)
*B62K 21/02* (2006.01)

(52) U.S. Cl.
CPC .............. *B62K 21/16* (2013.01); *B62K 21/02* (2013.01); *B62K 21/18* (2013.01)

(58) Field of Classification Search
CPC ........ B62K 21/02; B62K 21/16; B62K 21/18; B62K 21/22; B62K 15/00; Y10T 74/20792; Y10T 74/20798; Y10T 74/20804; Y10T 74/2081; Y10T 74/20816
USPC ................................. 280/278, 287, 279, 276
See application file for complete search history.

(56) References Cited

U.S. PATENT DOCUMENTS

| | | | | |
|---|---|---|---|---|
| 3,331,617 A | * | 7/1967 | Jacoby | B62K 21/12 280/279 |
| 3,337,240 A | * | 8/1967 | Rizzato | B62K 3/10 280/278 |
| 10,899,413 B2 | * | 1/2021 | Battistini | B62K 21/22 |

FOREIGN PATENT DOCUMENTS

WO    WO-2016167813 A1 * 10/2016 ............. B62K 21/16

* cited by examiner

*Primary Examiner* — Kevin Hurley
*Assistant Examiner* — Hosam Shabara
(74) *Attorney, Agent, or Firm* — Rabin & Berdo, P.C.

(57) ABSTRACT

A bicycle has a bicycle frame, two handle bars, and a clamping assembly. The bicycle frame has a front fork having a steerer tube mounted within a head tube of the bicycle frame and a handle mount fastened to the steerer tube and having two receiving tubes longitudinally disposed at two sides of the head tube, respectively. The two handle bars are rotatably mounted to the two receiving tubes, respectively, and each handle bar has a first section inserted inside a corresponding one of the two receiving tubes and a second section integrally fixed to the first section. The clamping assembly has two clamping units respectively mounted around the two receiving tubes and an operating unit connected to the two clamping units and being configured to abut the two clamping units for respectively clamping the two receiving tubes.

18 Claims, 14 Drawing Sheets

BICYCLE WITH COLLAPSIBLE HANDLE BARS

BACKGROUND OF THE INVENTION

1. Field of the Invention

The present invention relates to a bicycle, and more particularly to a bicycle that has foldable handle bars to transform into a compact form for easy transportation and storage.

2. Description of Related Art

A conventional bicycle has a bicycle frame with a head tube, a front fork, and a handle. The head tube is disposed at a front portion of the bicycle frame. The front fork is mounted to the head tube and is capable of rotating relative to the head tube. The handle is connected to the front fork. The front fork and the handle are capable of rotating simultaneously.

However, the handle of the conventional bicycle protrudes toward two sides of the conventional bicycle, so the protruding handle causes problems of inconvenient storage, difficulty in transportation, and infeasibility to be parked in a limited space.

To overcome the shortcomings of the conventional bicycle, the present invention provides a bicycle with collapsible handle bars to mitigate or obviate the aforementioned problems.

SUMMARY OF THE INVENTION

The main objective of the present invention is to provide a bicycle with collapsible handle bars to facilitate ease in storage, transportation, and parking in limited spaces.

The bicycle comprises a bicycle frame, two handle bars, and a clamping assembly. The bicycle frame has a front fork having a steerer tube mounted within a head tube of the bicycle frame and a handle mount fastened to the steerer tube and having two receiving tubes longitudinally disposed at two sides of the head tube, respectively. The two handle bars are rotatably mounted around the two receiving tubes, respectively, and each handle bar has a first section inserted inside a corresponding one of the two receiving tubes and a second section integrally fixed to the first section. The clamping assembly has two clamping units respectively mounted around the two receiving tubes and an operating unit connected to the two clamping units and being configured to abut the two clamping units for respectively clamping the two receiving tubes.

Therefore, the bicycle in accordance with the present invention facilitates ease in storage and is capable of being parked in a limited space.

Other objects, advantages, and novel features of the invention will become more apparent from the following detailed description when taken in conjunction with the accompanying drawings.

DETAILED DESCRIPTION OF PREFERRED EMBODIMENTS

Figure 1:
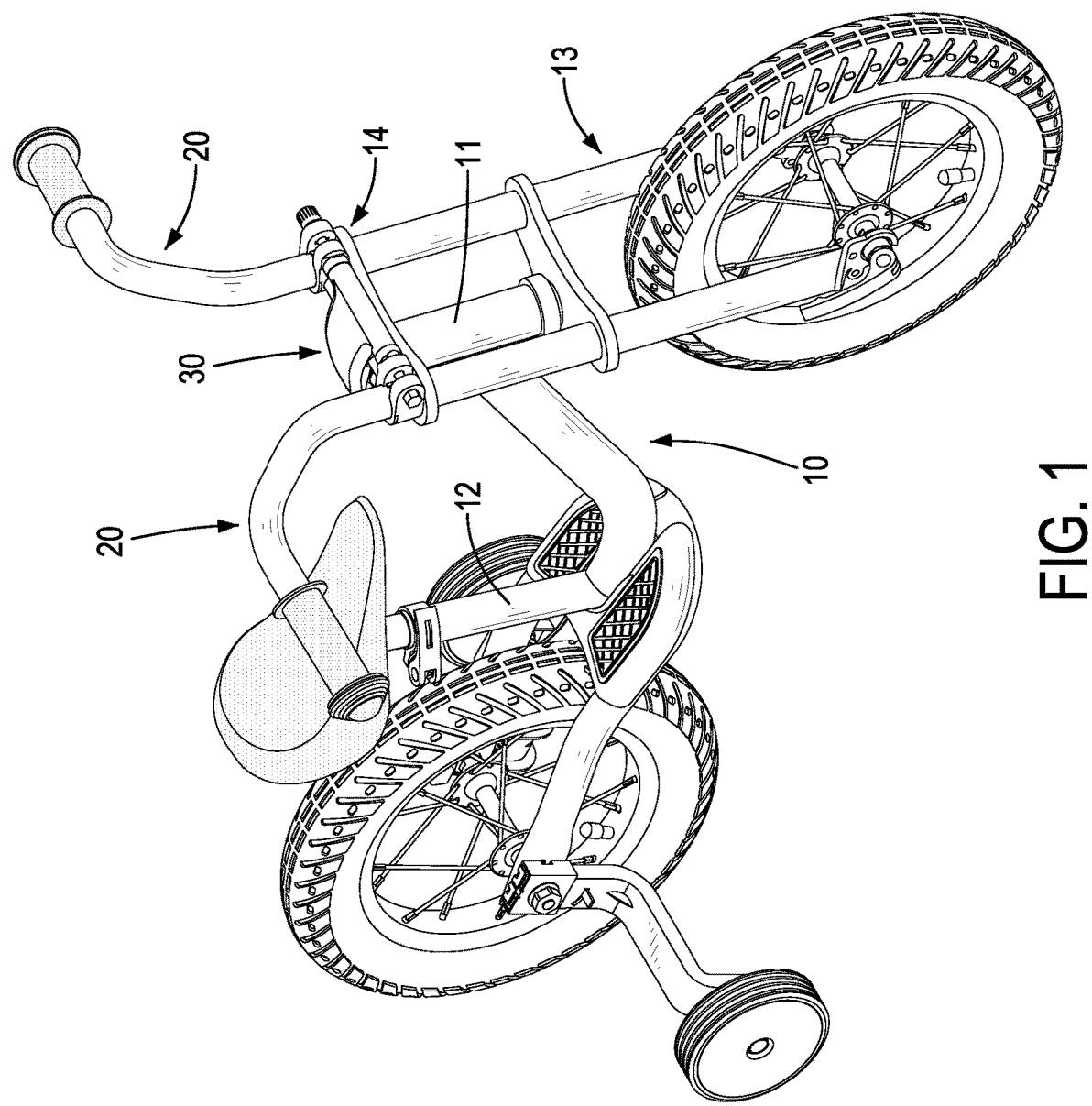
FIG. 1 is a perspective view of a first embodiment of a bicycle in accordance with the present invention.
Figure 2:
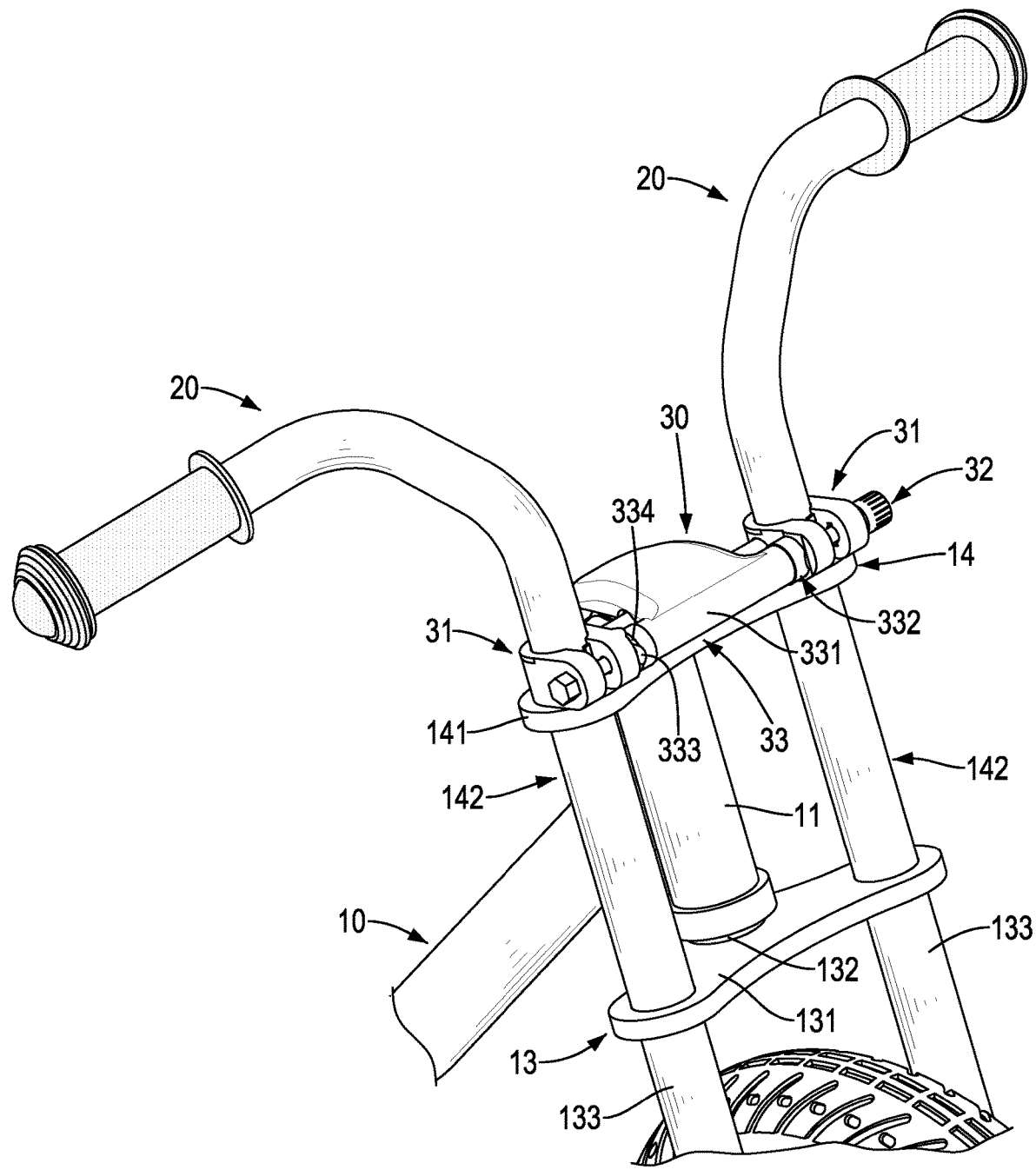
FIG. 2 is an enlarged perspective view of the first embodiment of the bicycle in FIG. 1.
Figure 3:
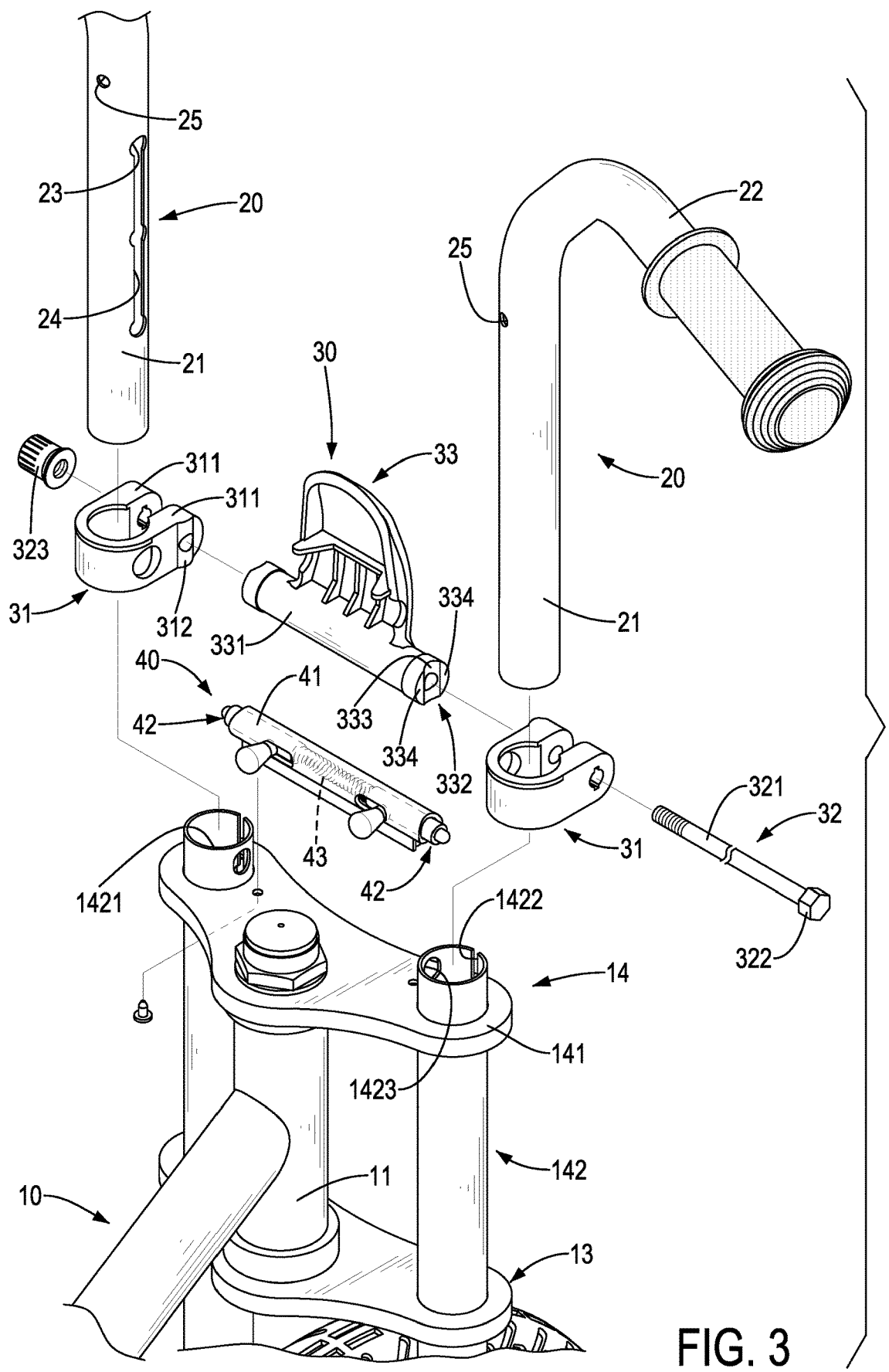
FIG. 3 is a partially exploded perspective view of the first embodiment of the bicycle in FIG. 2.

With reference to FIGS. 1 to 3, a first embodiment of a bicycle in accordance with the present invention has a bicycle frame 10, two handle bars 20, a clamping assembly 30, and a latch unit 40. The two handle bars 20, the clamping assembly 30, and the latch unit 40 are mounted on the bicycle frame 10.

With reference to FIGS. 1 and 2, the bicycle frame 10 has a down tube, a head tube 11, a seat tube 12, a front fork 13, and a handle mount 14. The down tube has a front end and a rear end being opposite each other and respectively point to a front and a rear of the bicycle frame 10. The head tube 11 is integrally formed at the front end of the down tube. The seat tube 12 is integrally formed at the rear end of the down tube and is configured to be assembled with a saddle. The front fork 13 has a connecting plate 131, a steerer tube 132 and two stanchions 133. The steerer tube 132 is integrally fixed to the connecting plate 131, is inserted within the head tube 11, and is capable of rotating relative to the head tube 11. The two stanchions 133 are integrally fixed to the connecting plate 131, are parallel to each other, and extend downward. The two stanchions 133 are configured to be assembled with a wheel.

With reference to FIGS. 1 to 3, the handle mount 14 has a mounting plate 141 and two receiving tubes 142. The mounting plate 141 of the handle mount 14 is fastened to a top end of the steerer tube 132 and is capable of rotating with the steerer tube 132 simultaneously. The two receiving tubes 142 are fastened to the mounting plate 141 and longitudinally extend toward the two stanchions 133 of the front fork 13. The two receiving tubes 142 are parallel to each other and are respectively disposed at two sides of the head tube 11. Each receiving tube 142 has an inserting opening 1421, a slit 1422, and a through hole 1423. The inserting opening 1421 is disposed at a top end of the receiving tube 142. The slit 1422 is defined longitudinally in the top end of the receiving tube 142 and communicates with the inserting opening 1421 of the receiving tube 142. The through hole 1423 is defined in the receiving tube 142 at a position adjacent to the inserting opening 1421. The two through holes 1423 of the two receiving tubes 142 are aligned with each other.

With FIGS. 1 to 3, the two handle bars 20 are rotatably connected to the two receiving tubes 142, respectively. Each handle bar 20 substantially is an integrally L-shaped component and has a first section 21, a second section 22 integrally fixed to the first section 21, multiple limiting holes 23, an elongated groove 24, and an auxiliary engaging hole 25. The first section 21 of each handle bar 20 is inserted inside a corresponding one of the two receiving tubes 142 via the inserting opening 1421 of the corresponding receiving tube 142. A handle grip is mounted around the second section 22 of each handle bar 20. The multiple limiting holes 23 of each handle bar 20 are longitudinally arranged along the first section 21. Each one of the multiple limiting holes 23 of each handle bar 20 has a diameter. The elongated groove 24 of each handle bar 20 is disposed at the first section 21 of said handle bar 20, longitudinally extends and communicates with the multiple limiting holes 23 of the said handle bar 20, and has a width smaller than the diameter of each one of the multiple limiting holes 23 of the handle bar 20. The auxiliary engaging hole 25 is defined in the first section 21 at a position above the multiple limiting holes 23.

With reference to FIGS. 1 to 3, the clamping assembly 30 has two clamping units 31, a pivoting shaft 32, and an operating unit 33. The two clamping units 31 are respectively mounted around the two receiving tubes 142. Each clamping unit 31 is U-shaped, is mounted around a corresponding one of the two receiving tubes 142, and has two clamping arms 311 and an abutted protrusion 312. The two clamping arms 311 of each clamping unit 31 are parallel to each other and are separated by the corresponding receiving tube 142. The abutted protrusion 312 of each clamping unit 31 is formed on one of the two clamping arms 311 of the clamping unit 31 and is elongated. The two abutted protrusions 312 of the two clamping units 31 are parallel and aligned with each other.

With reference to FIGS. 1 to 3, the pivoting shaft 32 has a pole 321, a blocking head 322, and an adjusting nut 323. The pole 321 is mounted through the clamping arms 311 of the two clamping units 31 and has two opposite ends. The blocking head 322 is integrally formed at one of the two opposite ends of the pole 321. The adjusting nut 323 is screwed at the other one of the two opposite ends of the pole 321. The operating unit 33 is an operating lever. The operating unit 33 has an abutting tube 331 mounted around the pole 321. The abutting tube 331 is capable of rotating about the pole 321 and has two abutting structures 332 respectively disposed at two opposite ends of the abutting tube 331 and respectively abutting the two clamping units 31. The operating unit 33 is connected to the two clamping units 31 by the abutting tube 331 mounted around the pole 321, which is mounted through the clamping arms 311 of the two clamping units 31. The operating unit 33 is configured to abut the two clamping units 31 for respectively clamping the two receiving tubes 142. Each abutting structure 332 has a groove 333 formed in a corresponding one of the two opposite ends of the abutting tube 331 and two abutting protrusions 334 respectively formed at two sides of the groove 333. The two grooves 333 of the two abutting structures 332 are aligned with each other. The abutted protrusion 312 of each clamping unit 31 is received in the groove 333 of a corresponding one of the abutting structures 332 or is abutted against by the two abutting protrusions 334 of the corresponding abutting structure 332 selectively. In the first embodiment, the operating unit 33 is implemented as one operating lever. Practically, the operating unit 33 may be implemented as two operating levers being configured to respectively abut the two clamping units 31. The clamping assembly 30 may be implemented as two quick release clamps respectively mounted around the two receiving tubes 142.

Figure 6:
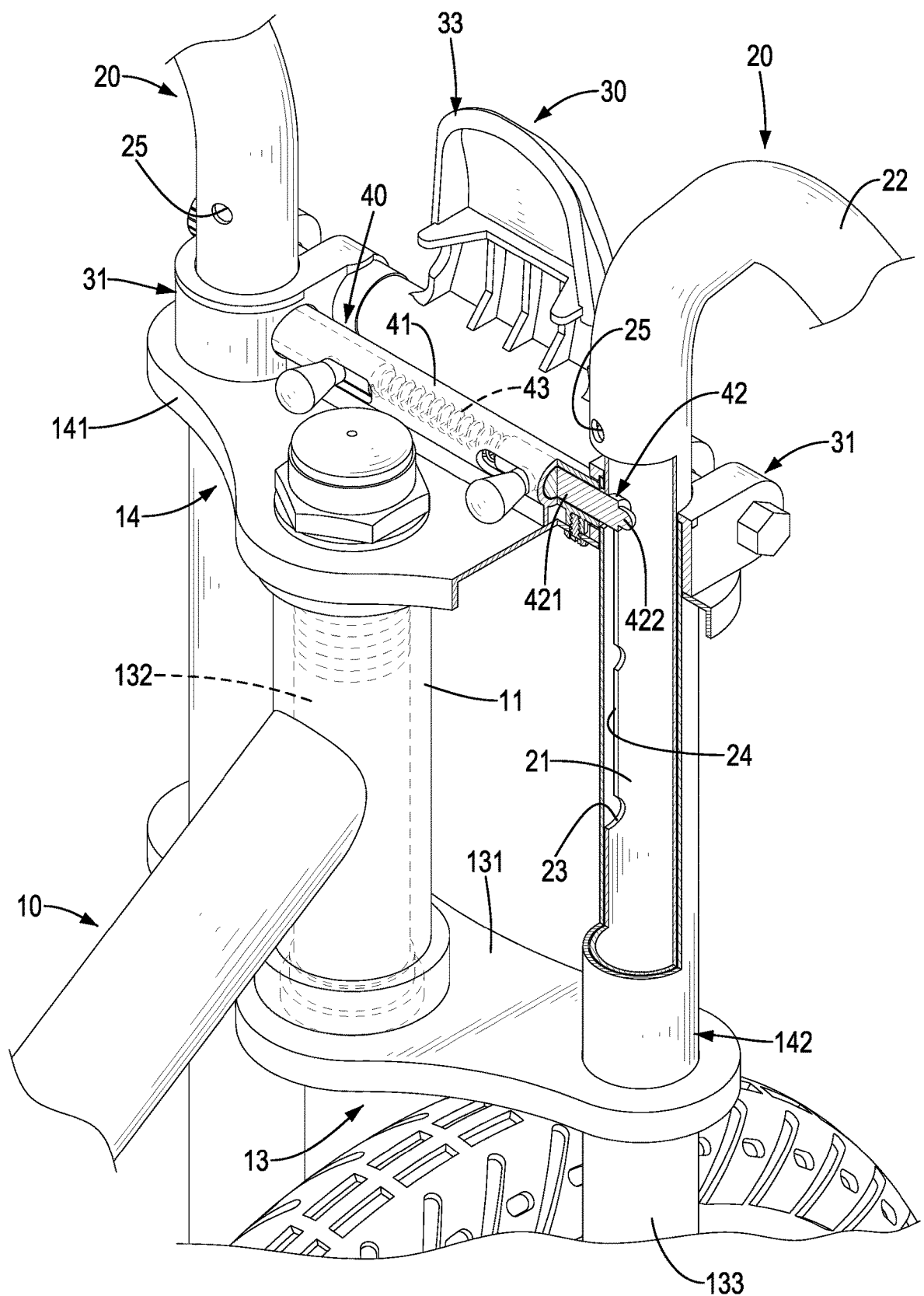
FIG. 6 is an enlarged perspective view in partial section of the first embodiment of the bicycle in FIG. 1.
Figure 7:
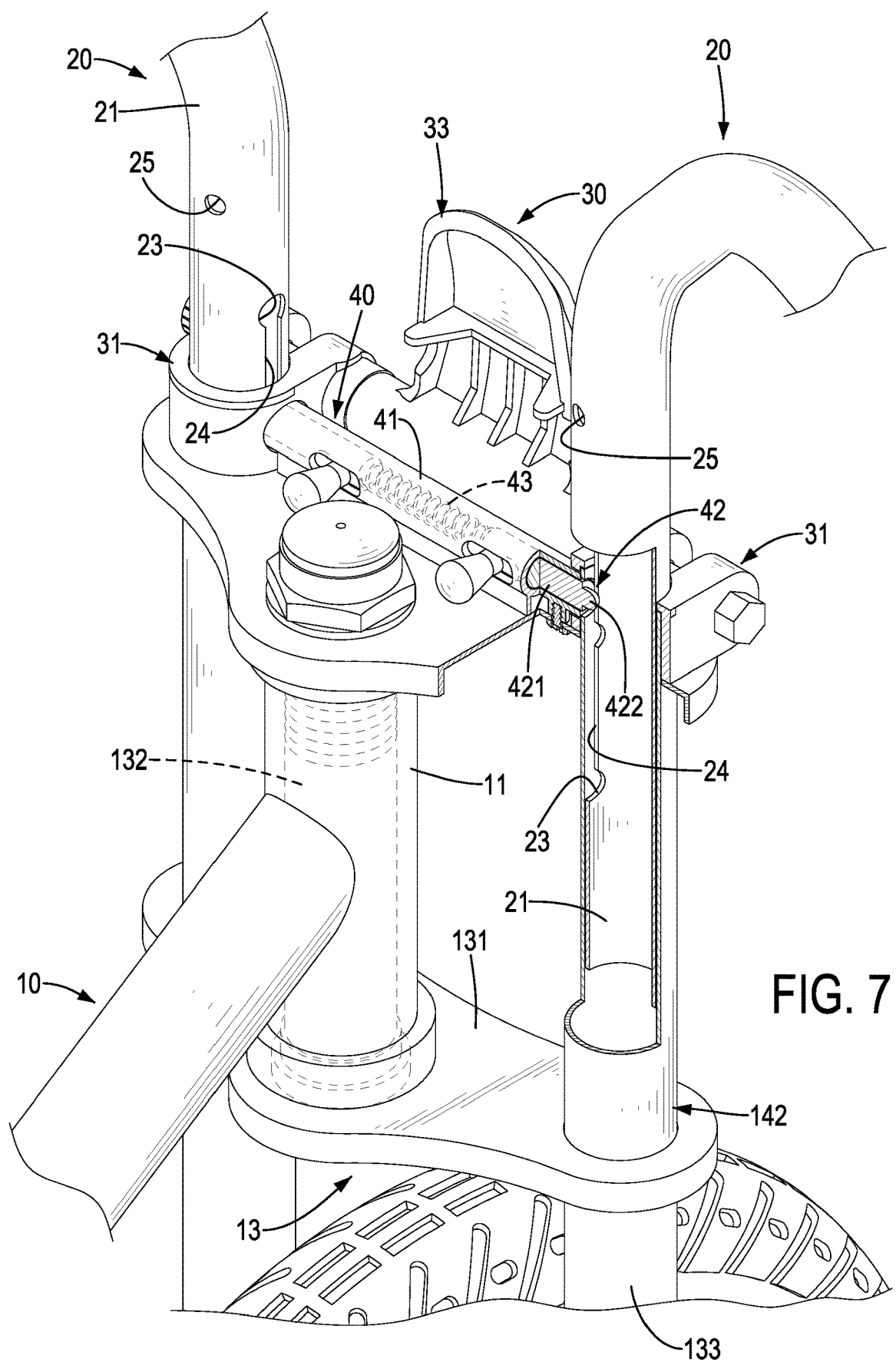
FIG. 7 is an operational perspective view in partial section of the first embodiment of the bicycle in FIG. 1, showing the two handle bars moved upward.

With reference to FIGS. 3, 6, and 7, the latch unit 40 has a barrel 41, two bolts 42, and an elastic unit 43. In the first embodiment, the barrel 41 is disposed between the two receiving tubes 142 and is fastened to the mounting plate 141 of the handle mount 14. The barrel 41 is elongated and has two opposite ends. One of the two opposite ends of the barrel 41 extends toward the through hole 1423 of one of the two receiving tubes 142. The other one of the two opposite ends of the barrel 41 extends toward the through hole 1423 of the other one of the two receiving tubes 142.

With reference to FIGS. 3, 6, and 7, the two bolts 42 are mounted within the barrel 41 and are capable of sliding along the barrel 41. Each one of the two bolts 42 has an engaging section 421 and a guiding section 422. The engaging section 421 of each bolt 42 has a diameter corresponding in size to the diameter of each one of the multiple limiting holes 23 of each handle bar 20. The guiding section 422 is coaxially and integrally formed on the engaging section 421 of the bolt 42 and has a width corresponding to the width of the elongated groove 24 of each handle bar 20. The elastic unit 43 is mounted within the barrel 41, is disposed between the two bolts 42, and has two opposite ends. The two opposite ends of the elastic unit 43 respectively abut the two bolts 42. In the present invention, the elastic unit 43 is a compression spring.

Figure 4:
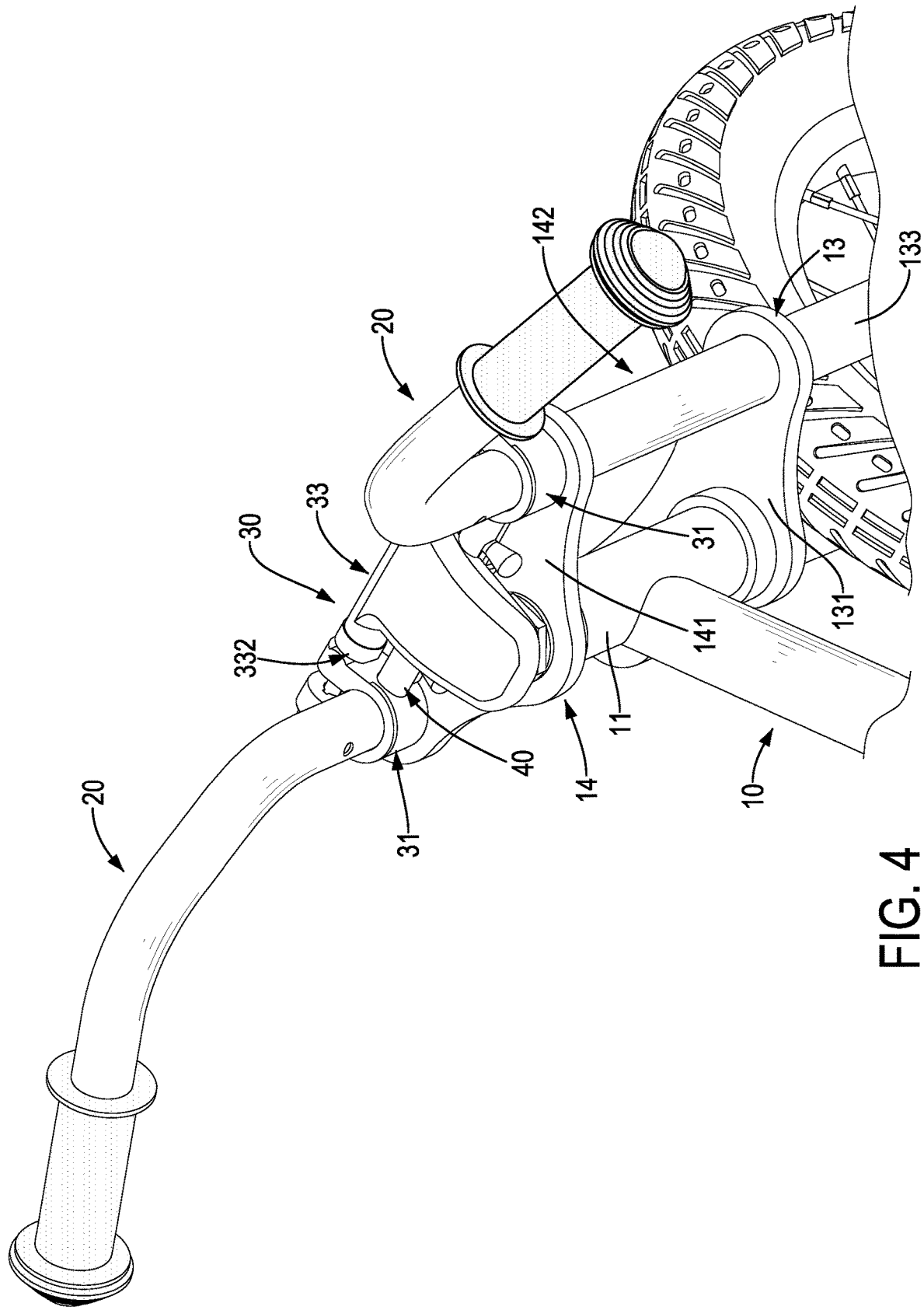
FIG. 4 is another partially enlarged perspective view of the first embodiment of the bicycle in FIG. 1, showing two handle bars in an expanded condition.

With reference to FIGS. 3 and 4, when the abutting protrusions 334 of each abutting structure 332 of the abutting tube 331 abut against the abutted protrusion 312 of a corresponding one of the two clamping units 31, the two clamping units 31 are abutted by the operating unit 33 and the two clamping units 31 respectively clamp the two receiving tubes 142. Each receiving tube 142 with the slit 1422 extending to the inserting opening 1421 of the receiving tube 142 retracts accordingly. Therefore, each receiving tube 142 clamps the first section 21 of one of the two handle bars 20 inserted in the receiving tube 142, and said one of the two handle bars 20 is unable to rotate relative to the receiving tube 142.

Figure 5:
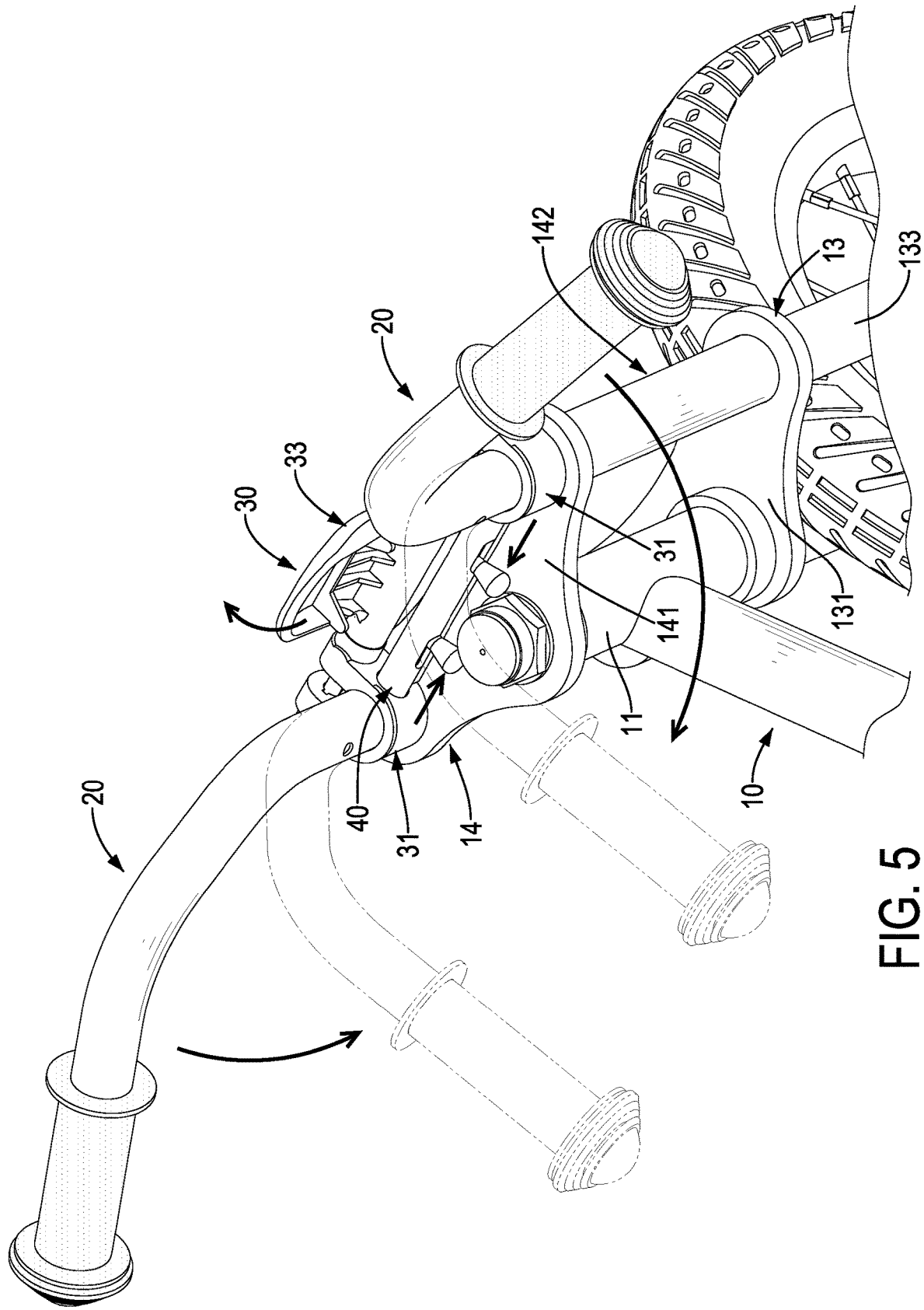
FIG. 5 is an operational perspective view of the first embodiment of the bicycle in FIG. 1, showing the two handle bars in a folded condition.

With reference to FIGS. 3 and 5, when the groove 333 of each abutting structure 332 of the abutting tube 331 receives the abutted protrusion 312 of a corresponding one of the two clamping units 31, the two clamping units 31 are free from being abutted and do not clamp the two receiving tubes 142. Consequently, each handle bar 20 is capable of rotating relative to a corresponding one of the two receiving tubes 142 for both being expanded and collapsed. After the handle bars 20 being expanded or collapsed, the operating unit 33 is switched again, and the two clamping units 31 are abutted by the operating unit 33 again for respectively clamping the two receiving tubes 142 and preventing the two handle bars 20 rotating relative to the two receiving tubes 142 respectively. In the FIG. 6, the guiding section 422 of each bolt 42 can engage with the auxiliary engaging hole 25 of a corresponding one of the handle bars 20 to provide a further limitation for preventing said handle bar 20 from being rotating.

By the mechanism introduced above, the two handle bars 20 are capable of respectively rotating relative to the two receiving tubes 142 for collapsing. With reference to FIGS. 3 and 5, after the two handle bars 20 being rotating, in FIG. 5, the two second sections 22 of the handle bars 20 point to the rear of the bicycle frame 10. Practically, the two second sections 22 may optionally point to the rear and the front of the bicycle frame 10 either.

Therefore, the two handle bars 20 are capable of being expanded for riding the bicycle. When the operating unit 33 abuts against the two clamping units 31, the two clamping units 31 respectively clamp the two receiving tubes 142, the two receiving tubes 142 respectively clamp the two handle bars 20, and the two handle bars 20 remain in the expanded condition. Therefore, a rider can hold the stationary handle bars 20 and ride the bicycle in accordance with the present invention safely.

To store the bicycle in accordance with the present invention, the operating unit 33 is kept from abutting the two clamping units 31. The two handle bars 20 are free from being respectively clamped by the two receiving tubes 142. The two handle bars 20 pivot toward each other and are folded. Then the operating unit 33 is switched again to abut the two clamping units 31 and keep the two handle bars 20 stationary.

The two handle bars 20 rapidly shift from the expanded condition to the folded condition just by pivoting the operating unit 33 and the two handle bars 20. Without the protruding handle bars 20, the bicycle in accordance with the present invention is easily stored and is capable of being parked in a limited space.

Figure 8:
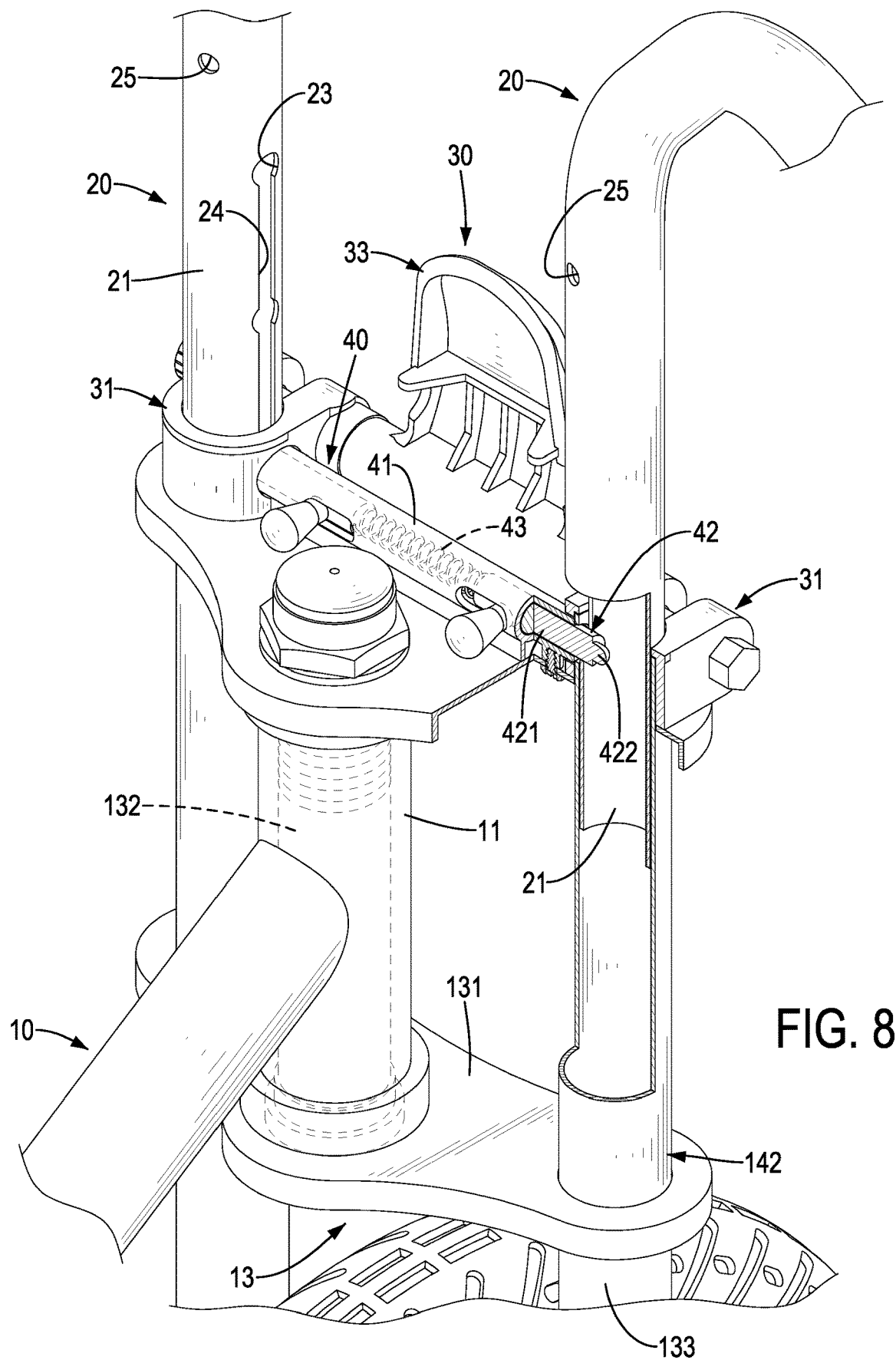
FIG. 8 is another enlarged perspective view in partial section of the first embodiment of the bicycle in FIG. 1, showing the two handle bars fixed to a determined height.

With reference to FIGS. 6 to 8, when the two clamping units 31 are free from being abutted by the operating unit 33, the two bolts 42 move toward each other, the engaging section 421 of each bolt 42 is ejected from one of the limiting holes 23 of a corresponding one of the handle bars 20, and the elongated groove 24 is located around the guiding section 422 of the bolt 42. Consequently, the two handle bars 20 are capable of moving up and down respectively relative to the two receiving tubes 142 for height adjustment. The guiding groove 24 of each handle bar 20 is blocked by the guiding section 422 of a corresponding one of the two bolts 42, and the handle bar 20 is capable of smoothly moving up and down without rotating.

By the mechanism introduced above, the heights of the two handle bars 20 can be conveniently adjusted according to a stature of the rider.

Figure 9:
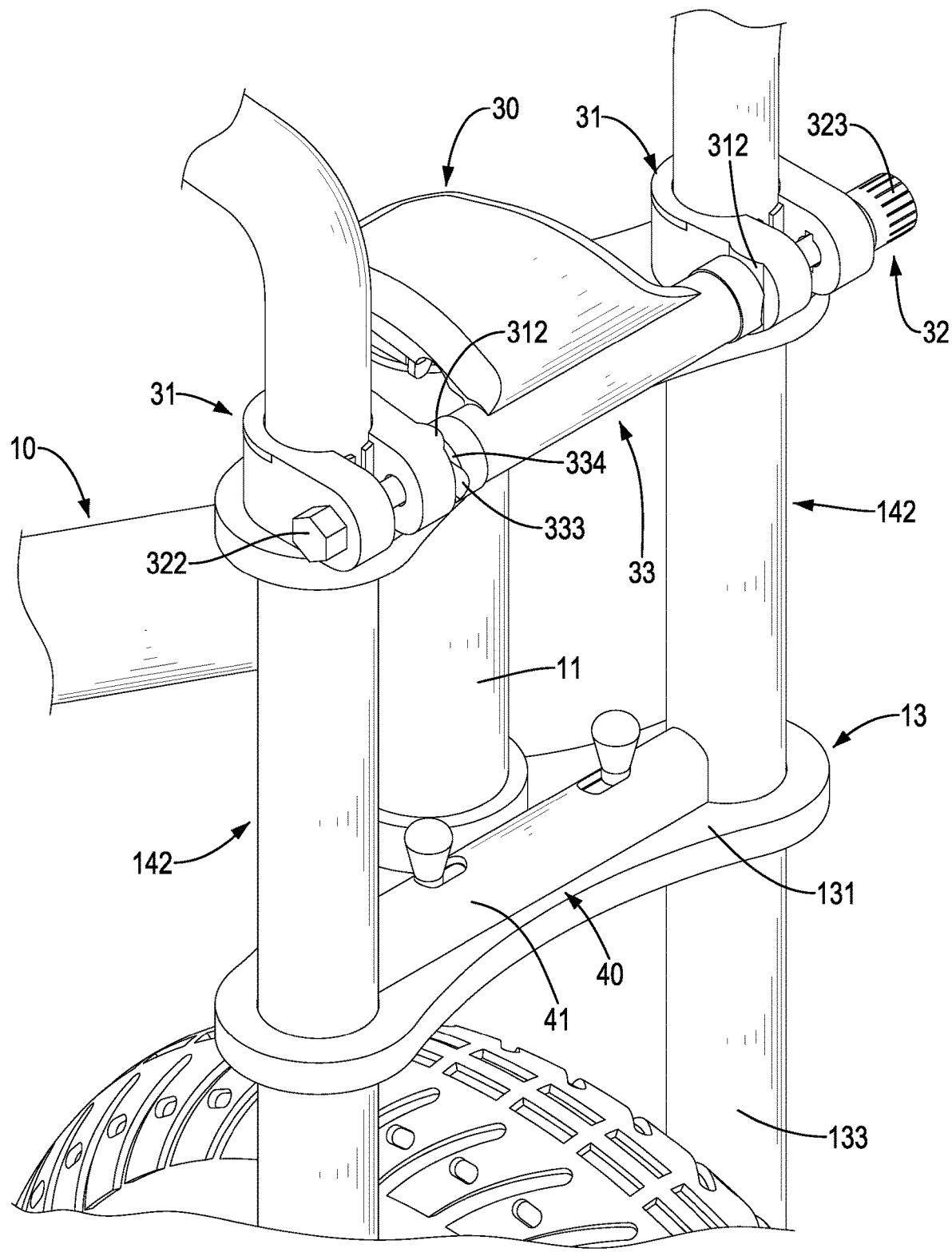
FIG. 9 is an enlarged perspective view of a second embodiment of the bicycle in accordance with the present invention.
Figure 10:
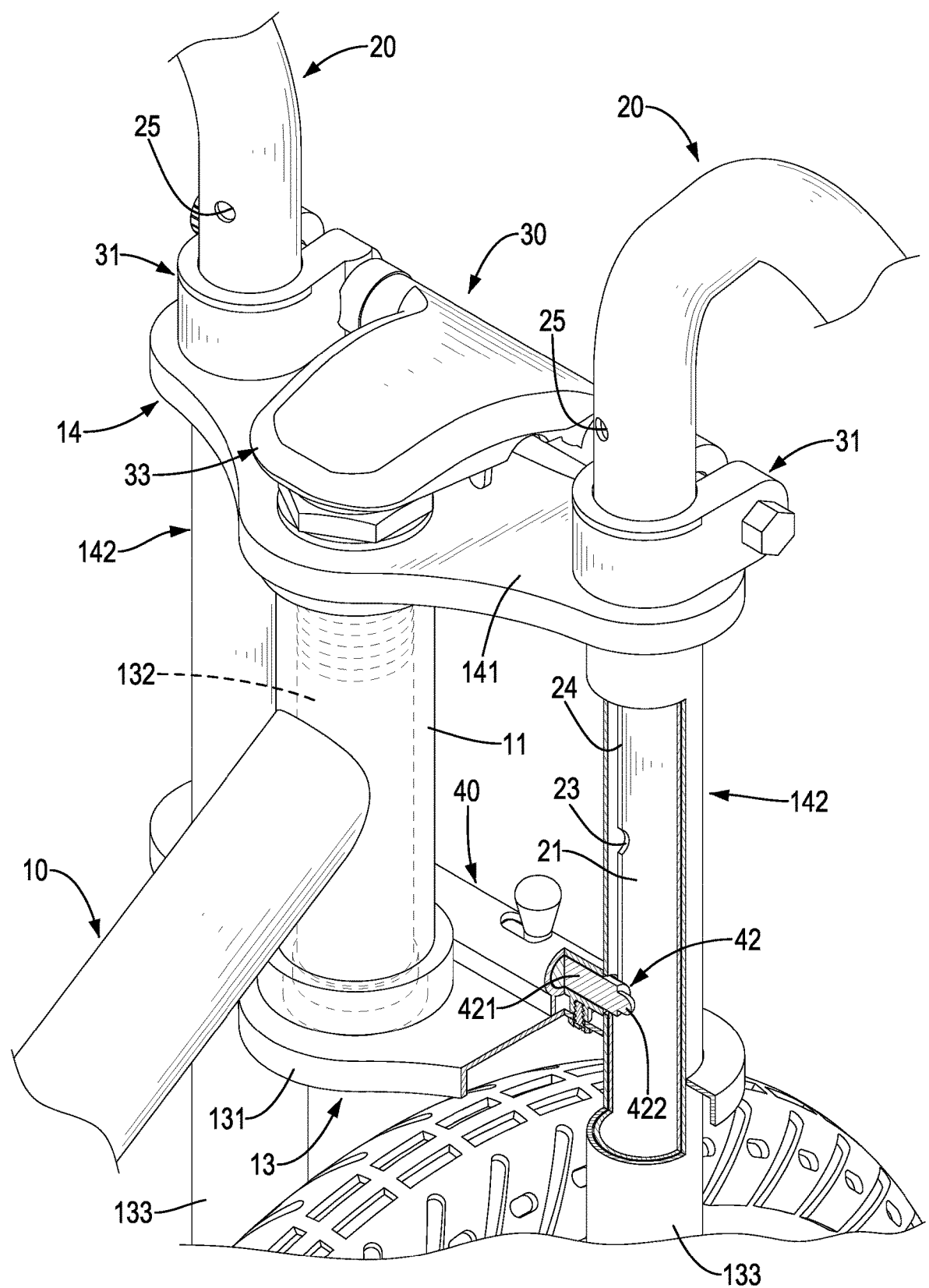
FIG. 10 is another enlarged perspective view in partial section of the second embodiment of the bicycle in FIG. 9.

With reference to FIGS. 9 and 10, a second embodiment of the bicycle in accordance with the present invention is substantially same as the first embodiment. In the second embodiment, the barrel 41 of the latch unit 40 is fastened to the connecting plate 131 of the front fork 13. Position of the through hole 1423 of each receiving tube 142 is modified according to the latch unit 40. The two handle bars 20 are deeply and respectively inserted in the two receiving tubes 142. The multiple limiting holes 23 and the elongated groove 24 of each handle bar 20 are disposed within a corresponding one of the two receiving tubes 142. Said limiting holes 23 and elongated groove 24 are free from exposure outside the corresponding one of the two receiving tubes 142 even during height adjustment. Fingers of the rider will not be accidently clamped by the limiting holes 23 and elongated groove 24. Therefore, compared to the first embodiment, it is safer to adjust the heights of the two handle bars 20 in the second embodiment.

Figure 11:
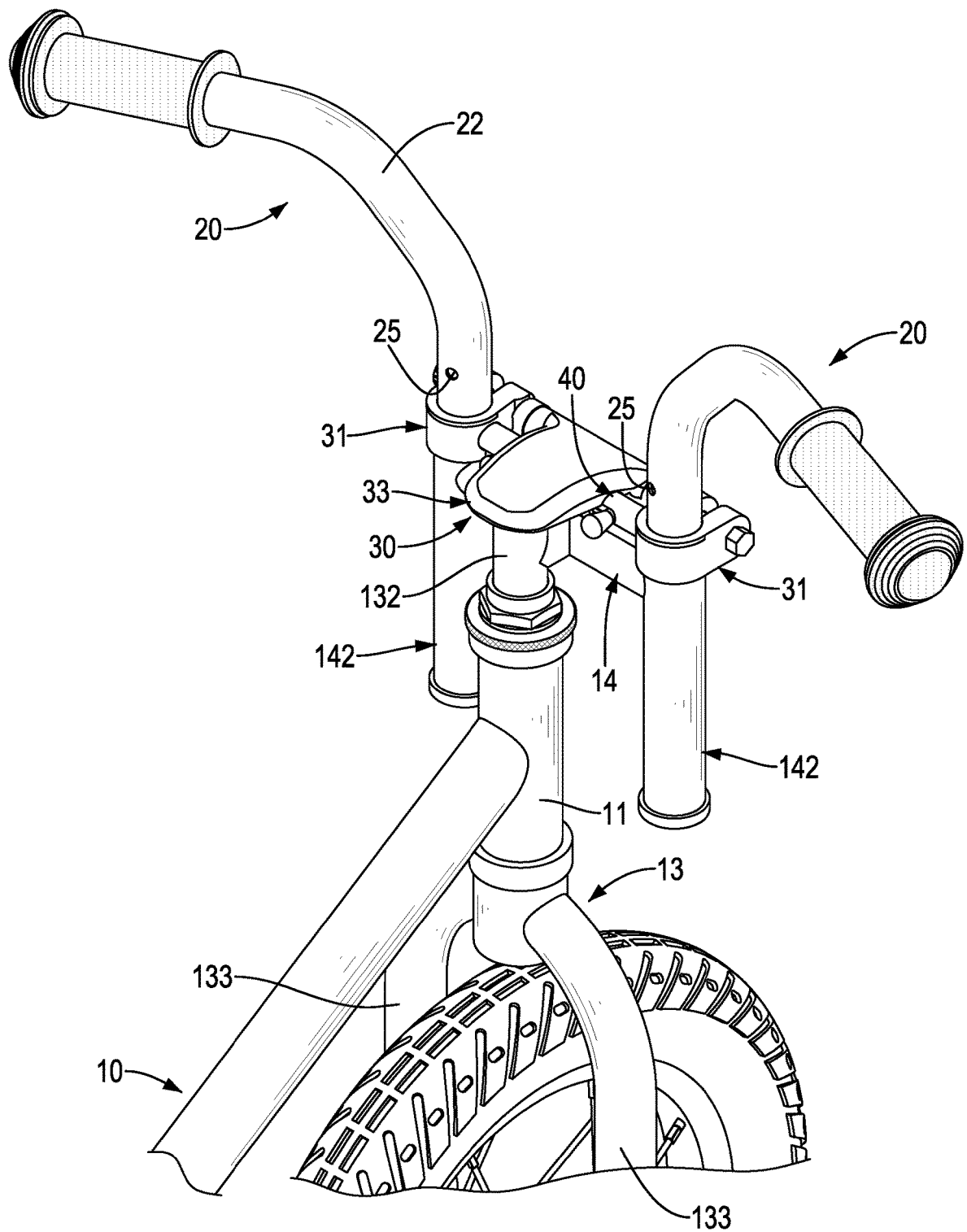
FIG. 11 is an enlarged perspective view of a third embodiment of the bicycle in accordance with the present invention.

With reference to FIGS. 6 and 10, in the first and the second embodiments, the two receiving tubes 142 of the handle mount 14 are coaxially and integrally connected to the two stanchions 132 of the front fork 13, respectively. More specifically, the two stanchions 132 extend through the connecting plate 131 and the mounting plate 141 to respectively form the two receiving tubes 142. With further reference to FIG. 11, a third embodiment of the bicycle in accordance with the present invention is substantially same as the first embodiment. In the third embodiment, the two receiving tubes 142 of the handle mount 14 and the stanchions 132 of the front fork 13 are individual components.

In the first, the second, and the third embodiment, the two bolts 42 are driven by the elastic unit 43. With the single elastic unit 43, the two handle bars 20 can be collapsed simultaneously or can be collapsed one by one.

Figure 12:
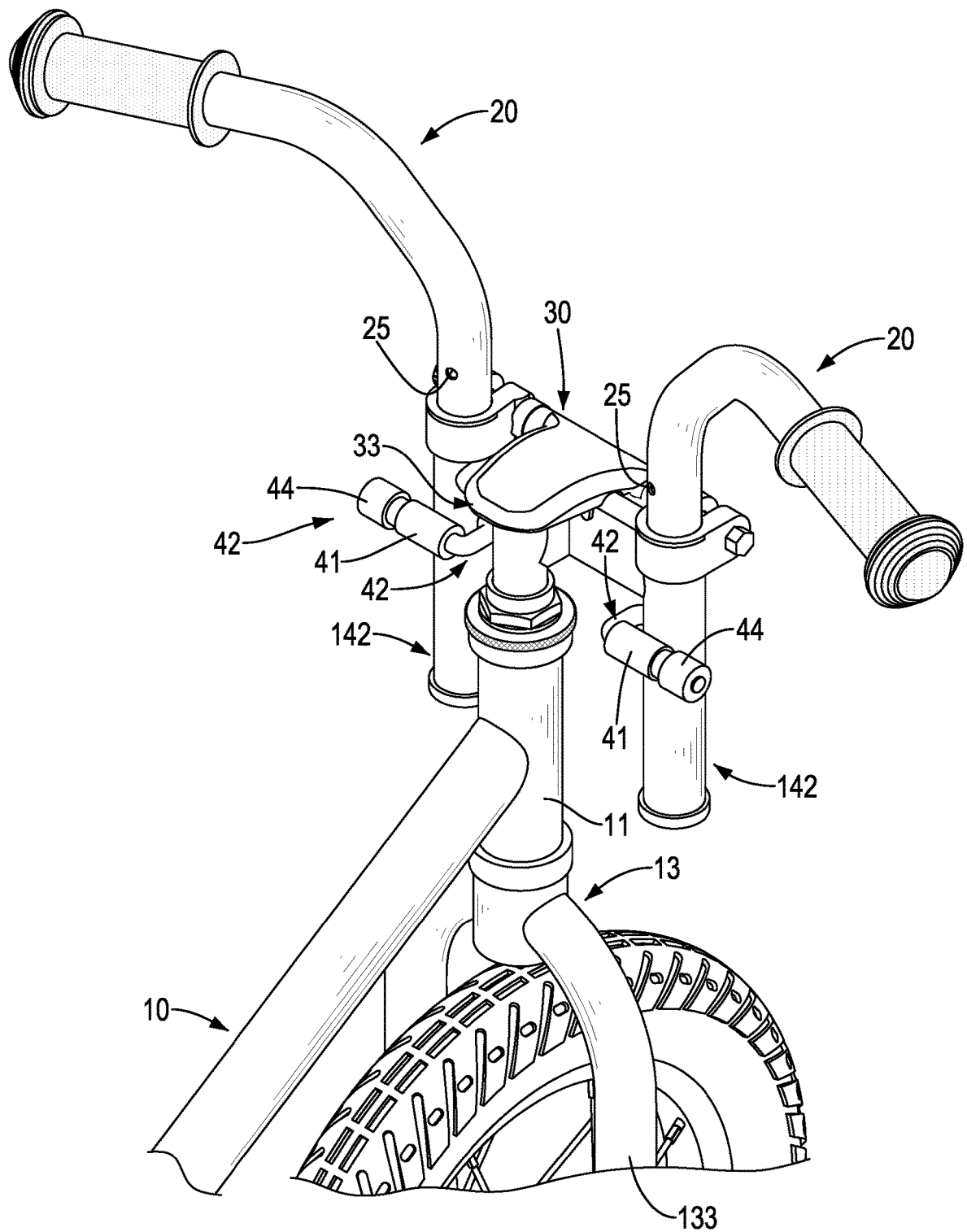
FIG. 12 is an enlarged perspective view of a fourth embodiment of the bicycle in accordance with the present invention.
Figure 13:
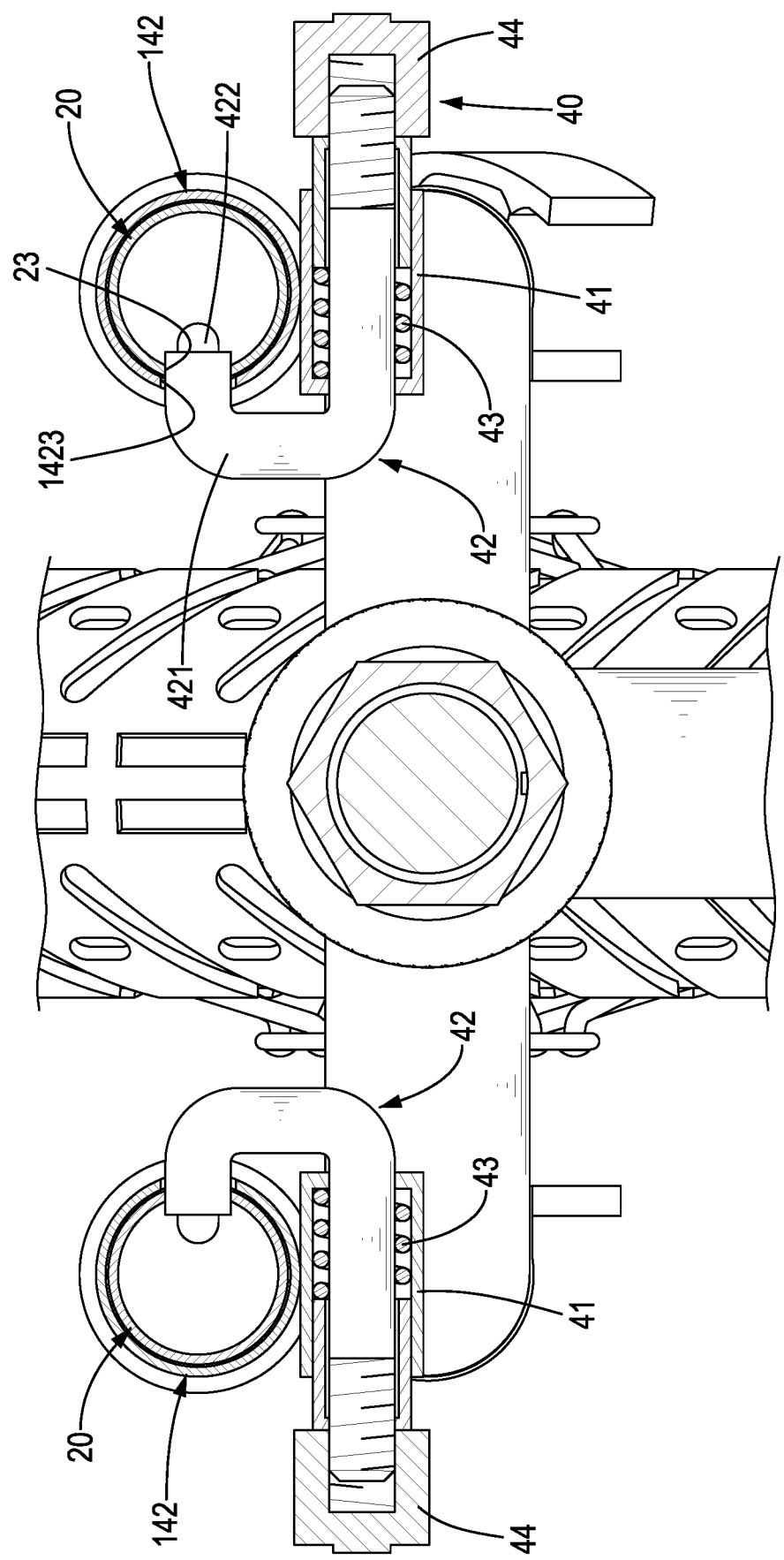
FIG. 13 is an operational top view in partial section of the fourth embodiment of the bicycle in FIG. 12, showing two bolts respectively engaging with the two handle bars.
Figure 14:
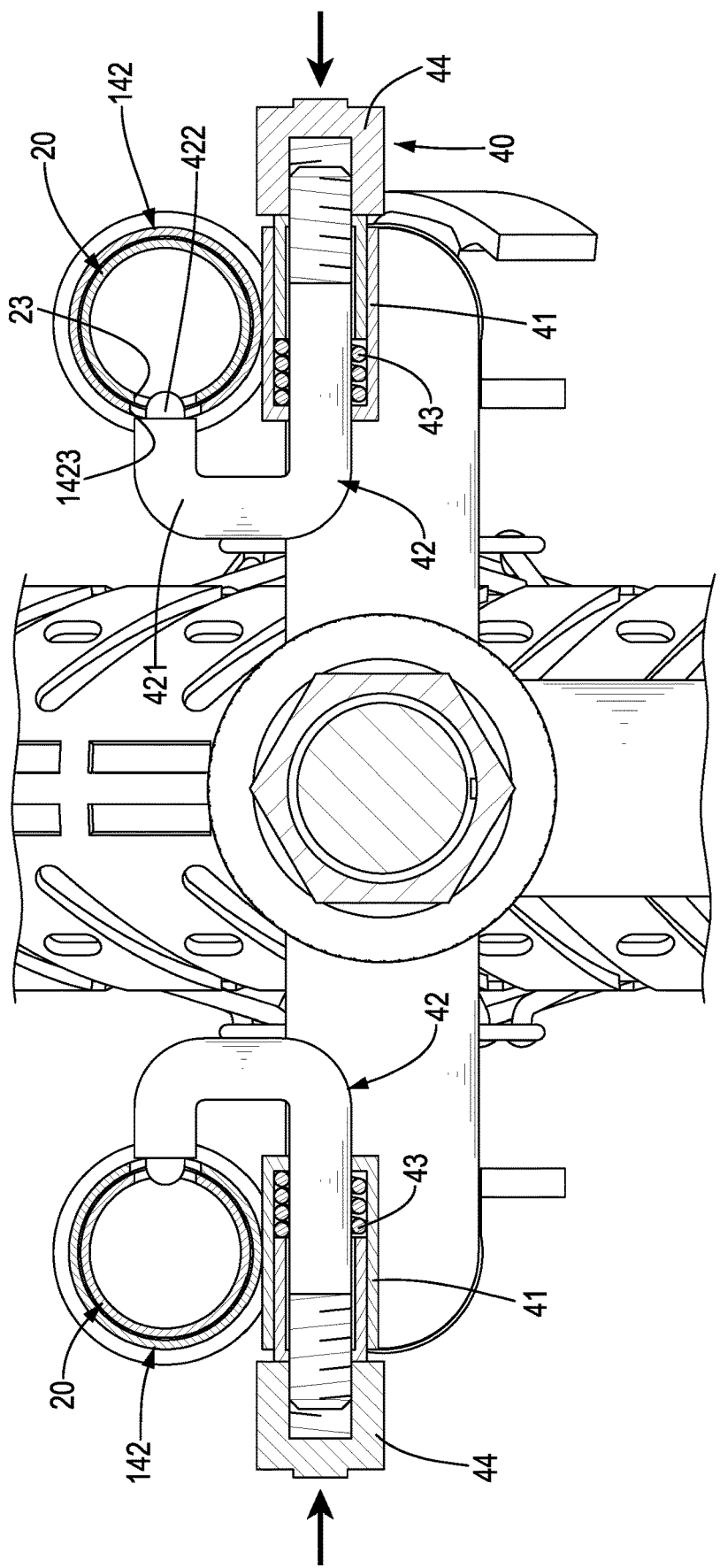
FIG. 14 is another operational top view in partial section of the fourth embodiment of the bicycle in FIG. 12, showing the two bolts being free from respectively engaging with the two handle bars.

With reference to FIGS. 12 to 14, a fourth embodiment of the bicycle in accordance with the present invention is substantially same as the third embodiment. In the fourth embodiment, the latch unit 40 has two barrels 41 and two elastic units 43. The two barrels 41 are respectively connected to the two receiving tubes 142. The two bolts 42 are respectively mounted through the two barrels 41. The engaging section 421 of each bolt 42 is a hook in the fourth embodiment. The engaging section 421 of each bolt 42 has a terminal end, and the guiding section 422 of the bolt 42 is integrally formed at the terminal end of the engaging section 421. Each bolt 42 is assembled with a pressing cap 44 disposed opposite to the engaging section 421. The two elastic units 43 are two compression springs respectively mounted within the two barrels 41. The two elastic units 43 are respectively mounted within the two barrels 41 and respectively abut against the two barrels 41 and the two bolts 42 respectively mounted through the two barrels 41.

With reference to FIGS. 13 and 14, when the two clamping units 31 are free from being abutted by the operating unit 33 as shown in FIG. 3, the pressing cap 44 mounted with one of the two bolts 42 is pressed, and the engaging section 421 of said bolt 42 is ejected from one of the limiting holes 23 of a corresponding one of the handle bars 20. As described above, the two handle bars 20 are capable of moving up and down relative to the two receiving tubes 142, respectively, for height adjustment. The pressing caps 44 respectively mounted to the two bolts 42 can be pressed simultaneously for rapidly height adjustment.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A bicycle comprising:
   a bicycle frame having
      a head tube;
      a front fork having a steerer tube and two stanchions, the steerer tube mounted to the head tube and capable of rotating relative to the head tube and the two stanchions being parallel to each other;
      a handle mount fastened to the steerer tube, capable of rotating with the steerer tube simultaneously, and having two receiving tubes longitudinally extending toward the two stanchions and respectively disposed at two sides of the head tube;

two handle bars rotatably mounted to the two receiving tubes respectively, and each handle bar substantially being L-shaped and having
 a first section inserted inside a corresponding one of the two receiving tubes; and
 a second section integrally fixed to the first section and being mounted around by a handle grip;

a clamping assembly having
 two clamping units respectively mounted around the two receiving tubes;
 each clamping unit being U-shaped, mounted around a corresponding one of the two receiving tubes, and having two clamping arms being parallel to each other and being separated by the corresponding receiving tube; and
 an operating unit connected to the two clamping units and selectively abutting the two clamping units for respectively clamping the two receiving tubes.

2. The bicycle as claimed in claim 1, wherein
the clamping assembly has a pivoting shaft having a pole mounted through the clamping arms of the two clamping units;
each clamping unit has an abutted protrusion formed on a respective one of the two clamping arms of the clamping unit and being elongated;
the abutted protrusion of one of the two clamping units is parallel to and aligned with the abutted protrusion of the other one of the two clamping units;
the operating unit has an abutting tube mounted around the pole, capable of rotating according to the pole, and having two abutting structures respectively disposed at two opposite ends of the abutting tube and respectively abutting the two clamping units;
each abutting structure has a groove formed in a corresponding one of the two opposite ends of the abutting tube and two abutting protrusions respectively formed at two sides of the groove;
the groove of one of the two abutting structures is in alignment with the groove of the other one of the two abutting structures;
wherein the abutted protrusion of each clamping unit is selectively received in the groove of a corresponding one of the abutting structures or abutted against by the two abutting protrusions of the corresponding abutting structure.

3. The bicycle as claimed in claim 2, wherein
the pivoting shaft has
 a blocking head integrally formed at one of two opposite ends of the pole; and
 an adjusting nut screwed at the other one of the two opposite ends of the pole.

4. The bicycle as claimed in claim 3, wherein
each receiving tube has
 an inserting opening for the first section of a corresponding one of the two handle bars to be inserted therein;
 a slit longitudinally defined in a top end of the receiving tube and communicating with the inserting opening; and
 a through hole defined in the receiving tube at a position adjacent to the inserting opening;
the through hole of one of the two receiving tubes is in alignment with the through hole of the other one of the two receiving tubes;

each handle bar has
 multiple limiting holes longitudinally arranged, and each one of the multiple limiting holes having a diameter; and
the bicycle has
 a latch unit having
  a barrel fastened to the handle mount, being elongated, and having two opposite ends;
  the two opposite ends of the barrel extending toward the two through holes of the two receiving tubes, respectively;
  an elastic unit mounted within the barrel and having two opposite ends; and
  two bolts mounted within the barrel, respectively abutting the two opposite ends of the elastic unit, and capable of sliding along the barrel, and each one of the two bolts having an engaging section with a diameter corresponding in size to the diameter of each one of the multiple limiting holes of each handle bar;
  the engaging section of one of the two bolts capable of extending through the through hole of one of the two receiving tubes and capable of engaging with one of the multiple limiting holes of one of the two handle bars inserted in said one of the two receiving tubes;
  the engaging section of the other one of the two bolts capable of extending through the through hole of the other one of the two receiving tubes and capable of engaging with one of the multiple limiting holes of one of the two handle bars inserted in said one of the two receiving tubs.

5. The bicycle as claimed in claim 4, wherein
each handle bar has
 an elongated groove disposed at the first section of the handle bar, longitudinally extending through the multiple limiting holes of the handle bar, and having a width smaller than the diameter of each one of the multiple limiting holes of the handle bar;
each bolt has a guiding section coaxially and integrally formed on the engaging section of the bolt and having a width corresponding to the width of the elongated groove of each handle bar;
the guiding section of one of the two bolts is capable of extending through the through hole of one of the two receiving tubes and is capable of being inserted in the groove of one of the two handle bars inserted in said one of the two receiving tubes; and
the guiding section of the other one of the two bolts is capable of extending through the through hole of the other one of the two receiving tubes and is capable of being inserted in said one of the two receiving tubes.

6. The bicycle as claimed in claim 5, wherein
each handle bar has an auxiliary engaging hole defined in the first section of the handle bar at a position above the multiple limiting holes of the handle bar;
the two bolts of the latch are capable of engaging with the auxiliary engaging holes of the two handle bars.

7. The bicycle as claimed in claim 4, wherein
each handle bar has an auxiliary engaging hole defined in the first section of the handle bar at a position above the multiple limiting holes of the handle bar;
the guiding sections of the two bolts of the latch are capable of engaging with the auxiliary engaging holes of the two handle bars.

8. The bicycle as claimed in claim 6, wherein
the handle mount has a mounting plate fastened to a top end of the steerer tube of the front fork;
the latch unit is mounted on the mounting plate.

9. The bicycle as claimed in claim 8, wherein the two receiving tubes are integrally and coaxially formed on the two stanchions, respectively.

10. The bicycle as claimed in claim 7, wherein the two receiving tubes are integrally and coaxially formed on the two stanchions, respectively.

11. The bicycle as claimed in claim 3, wherein
the front fork has a connecting plate which is integrally fixed to the steerer tube and the two stanchions;
each receiving tube has
    an inserting opening for the first section of a corresponding one of the two handle bars to be inserted therein;
    a slit longitudinally defined in a top end of the receiving tube and communicating with the inserting opening; and
    a through hole defined in the receiving tube at a position adjacent to the inserting opening;
the through hole of one of the two receiving tubes is in alignment with the through hole of the other one of the two receiving tubes;
each handle bar has
    multiple limiting holes longitudinally arranged, and each one of the multiple limiting holes having a diameter; and
the bicycle has
    a latch unit having
        a barrel fastened to the connecting plate, being elongated, and having two opposite ends;
        the two opposite ends of the barrel extending toward the two through holes of the two receiving tubes, respectively;
        an elastic unit mounted within the barrel and having two opposite ends; and
        two bolts mounted within the barrel, respectively abutting the two opposite ends of the elastic unit, and capable of sliding along the barrel, and each one of the two bolts having an engaging section with a diameter corresponding in size to the diameter of each one of the multiple limiting holes of each handle bar;
        the engaging section of one of the two bolts capable of extending through the through hole of one of the two receiving tubes and capable of engaging with one of the multiple limiting holes of one of the two handle bars inserted in said one of the two receiving tubes;
        the engaging section of the other one of the two bolts capable of extending through the through hole of the other one of the two receiving tubes and capable of engaging with one of the multiple limiting holes of one of the two handle bars inserted in said one of the two receiving tubs.

12. The bicycle as claimed in claim 11, wherein
each handle bar has
    an elongated groove disposed at the first section of the handle bar, longitudinally extending through the multiple limiting holes of the handle bar, and having a width smaller than the diameter of each one of the multiple limiting holes of the handle bar;
each bolt has a guiding section coaxially and integrally formed on the engaging section of the bolt and having a width corresponding to the width of the elongated groove of each handle bar;
the guiding section of one of the two bolts is capable of extending through the through hole of one of the two receiving tubes and is capable of being inserted in the groove of one of the two handle bars inserted in said one of the two receiving tubes; and
the guiding section of the other one of the two bolts is capable of extending through the through hole of the other one of the two receiving tubes and is capable of being inserted in said one of the two receiving tubes.

13. The bicycle as claimed in claim 12, wherein
each handle bar has an auxiliary engaging hole defined in the first section of the handle bar at a position above the multiple limiting holes of the handle bar;
the two bolts of the latch are capable of engaging with the auxiliary engaging holes of the two handle bars.

14. The bicycle as claimed in claim 11, wherein
each handle bar has an auxiliary engaging hole defined in the first section of the handle bar at a position above the multiple limiting holes of the handle bar;
the guiding sections of the two bolts of the latch are capable of engaging with the auxiliary engaging holes of the two handle bars.

15. The bicycle as claimed in claim 3, wherein
each receiving tube has
    an inserting opening for the first section of a corresponding one of the two handle bars to be inserted therein;
    a slit longitudinally defined in a top end of the receiving tube and communicating with the inserting opening; and
    a through hole defined in the receiving tube at a position adjacent to the inserting opening;
the through hole of one of the two receiving tubes is in alignment with the through hole of the other one of the two receiving tubes;
each handle bar has
    multiple limiting holes longitudinally arranged, and each one of the multiple limiting holes having a diameter; and
the bicycle has
    a latch unit having
        two barrels respectively connected to the two receiving tubes;
        two bolts respectively mounted through the two barrels, and each bolt having an engaging section being a hook, having a diameter corresponding in size to the diameter of each one of the multiple limiting holes of each handle bar, capable of penetrating through the through hole of one of the two receiving tubes, and capable of engaging with one of the multiple limiting holes of one of the two handle bars inserted in said one of the two receiving tubes; and
        two elastic units respectively mounted within the two barrels and respectively abutting against the two barrels, and the two bolts respectively mounted through the two barrels.

16. The bicycle as claimed in claim 15, wherein
each handle bar has
    an elongated groove disposed at the first section of the handle bar, longitudinally extending through the multiple limiting holes of the handle bar, and having a width thinner than the diameter of each one of the multiple limiting holes of the handle bar;

each bolt has a guiding section integrally formed at a terminal end of the engaging section of the bolt and having a width corresponding to the width of the elongated groove of each handle bar;

the guiding section of one of the two bolts is capable of extending through the through hole of one of the two receiving tubes and is capable of being inserted in the elongated groove of one of the two handle bars inserted in said one of the two receiving tubes; and the guiding section of the other one of the two bolts is capable of extending through the through hole of the other one of the two receiving tubes and is capable of being inserted in said one of the two receiving tubes.

17. The bicycle as claimed in claim 16, wherein each handle bar has an auxiliary engaging hole defined in the first section of the handle bar at a position above the multiple limiting holes of the handle bar;

the two bolts of the latch are capable of engaging with the auxiliary engaging holes of the two handle bars.

18. The bicycle as claimed in claim 15, wherein each handle bar has an auxiliary engaging hole defined in the first section of the handle bar at a position above the multiple limiting holes of the handle bar;

the guiding sections of the two bolts of the latch are capable of engaging with the auxiliary engaging holes of the two handle bars.

\* \* \* \* \*